United States Patent [19]

Cerny

[11] Patent Number: 4,800,787
[45] Date of Patent: Jan. 31, 1989

[54] SYSTEM TO INSTALL A VANDAL-RESISTANT SCREW

[76] Inventor: Alexander Cerny, P.O. Box 417, Sechelt, British Columbia, Canada, V0N 3A0

[21] Appl. No.: 2,847

[22] Filed: Jan. 13, 1987

[51] Int. Cl.$^4$ .................................. B25B 31/00
[52] U.S. Cl. ........................ 81/121.1; 29/525.1; 411/910
[58] Field of Search ............... 81/121.1, 459; 411/910, 411/911, 919; 29/76 R, 526 R, 401.1; 7/165, 158, 142

[56] References Cited

U.S. PATENT DOCUMENTS

| | | | |
|---|---|---|---|
| 1,243,799 | 10/1917 | Bissell | 411/910 |
| 1,856,002 | 4/1932 | Starkin | 51/241 VS |
| 2,103,944 | 12/1937 | Gullborg | 81/121.1 |
| 3,932,904 | 1/1976 | Starkin | 7/165 |
| 4,205,493 | 6/1980 | Kim | 51/73 R |

Primary Examiner—Robert P. Olszewski
Assistant Examiner—Maurina Rachuba
Attorney, Agent, or Firm—Townsend & Townsend

[57] ABSTRACT

A system to install a vandal-resistant screw. The system includes a screw having a head with a peripheral thread on the head. A tightening member is formed with a cavity. An internal thread within the cavity is able to tighten onto the peripheral thread on the head of the screw. A finishing member is formed with a cavity adapted to fit over the screw head. There are abrading surfaces within the cavity of the finishing member whereby the thread on the periphery of an installed screw can be abraded away by the abrading surfaces.

2 Claims, 1 Drawing Sheet

U.S. Patent    Jan. 31, 1989    4,800,787
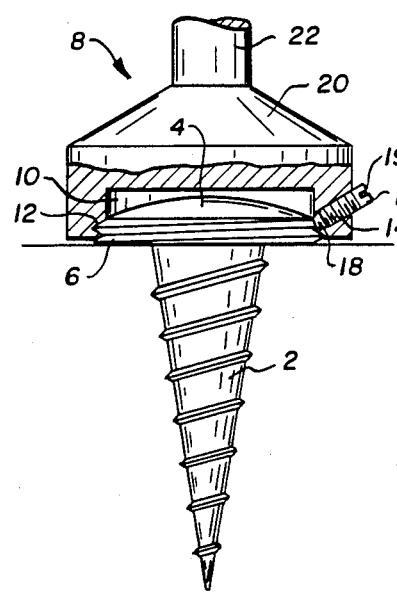
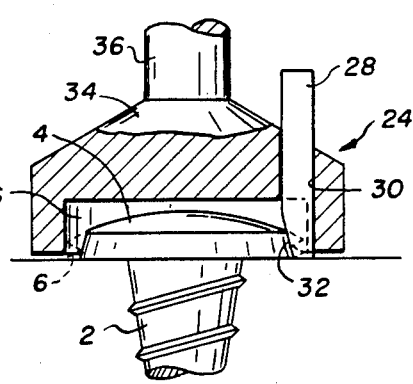
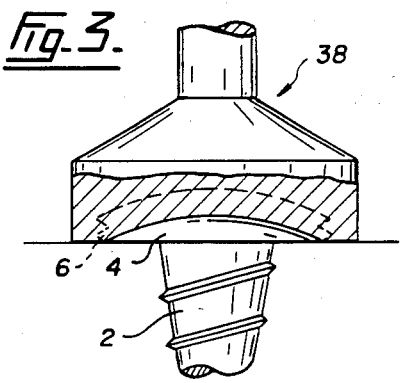
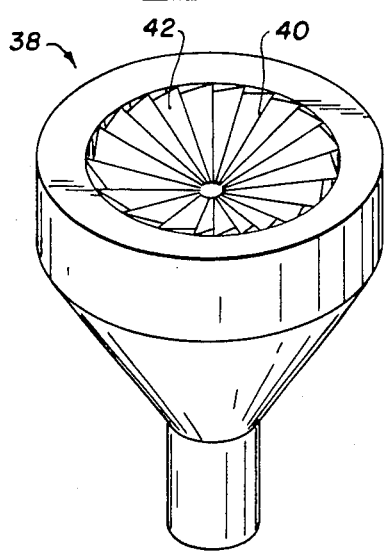

SYSTEM TO INSTALL A VANDAL-RESISTANT SCREW

FIELD OF THE INVENTION

This invention relates to a system to install a vandal-resistant screw and to a finishing member able to change the configuration of a screw head to eliminate any means of loosening the screw once the screw has been tightened and, thus, to render the screw vandal-proof.

DESCRIPTION OF THE PRIOR ART

Tamper-resistant or vandal-resistant screws are well known but although there would seem to be an increasing need for them they have found little application and are not readily available.

Prior art examples of these devices include those described and claimed in U.S. Pat. Nos.: 4,037,515 to Kesselman; 1,243,799 to Bissell; 4,018,111 to Goldhaber; 1,561,003 to Leloup; 1,261,916 to Forbes; and 3,897,112 to Walther.

Of the above Forbes discloses a screw with projections that are chipped away, once the screw is fastened, making the screw non-removable. Walther shows a resistance weld that destroys the thread. Leloup discloses a railway screw with a dual upper and lower thread. Goldhaber discloses a tamper-resistant head that is smooth. Bissell and Kesselman disclose tamper-resistant fasteners with frangible necks that break during installation so that the fastener cannot be removed once installed.

Fasteners provided with threaded heads are also known. Examples of such fasteners known to applicant include U.S. Pat. Nos.: 2,312,185 to Neunherz; 1,184,173 to Gehring; 3,667,338 to Johansson; 2,397,216 to Stellin; 2,222,667 to Eltzelman; 1,447,564 to Norlund et al.; 1,300,275 to Johnson.

Of the above patents Neunherz has the clearest showing of a threaded head. Neunherz however has no tamper-proof function. A conventional opening is provided in the head in Neunherz to allow attachment and removal of the screw by a conventional screwdriver blade. The threaded head in Neunherz receives a fitting that includes an acorn nut to engage the external thread on the screw head.

SUMMARY OF THE INVENTION

The present invention provides a system to install a vandal-resistant screw comprising a screw having a head and having a peripheral thread on the head; a tightening member formed with a cavity; an internal thread within the cavity, able to tighten onto the peripheral thread on the head of the screw; a finishing member formed with a cavity adapted to fit over the screw head; abrading means within the cavity of the finishing member whereby the thread on the periphery of an installed screw can be abraded away by the abrading means.

In a further aspect the present invention is a finishing member able to change the configuration of a screw head to eliminate any means of loosening the screw once the screw has been tightened into a structure, the finishing member comprising a cavity to fit over a screw head; abrasive means within the cavity to abrade the head.

DRAWINGS

Aspects of the invention are illustrated, merely by way of example, in the accompanying drawings in which:

FIG. 1 is a view, partially in section, of a first aspect of the present invention;

FIG. 2 resembles FIG. 1 but is of a different aspect of the present invention;

FIG. 3 illustrates yet a further aspect of the present invention; and

FIG. 4 illustrates the tool shown in FIG. 3 that also is generally useful as a finishing member.

DESCRIPTION OF THE PREFERRED EMBODIMENTS

The drawings show a system to install a vandal-resistant screw. Referring to FIG. 1 there is shown a screw 2 having a head 4 with a peripheral thread 6 on that head 4. A tightening member 8 is formed with a cavity 10. In the particular embodiment of FIG. 1 there is an internal thread 12 within the cavity 10, able to tighten onto the peripheral thread 6 on the head 4 of the screw 2.

The system includes a finishing member formed with a cavity adapted to fit over the screw head with abrading means within the cavity of the finishing member so that the thread 6 on the periphery of head 4 of an installed screw 2 can be abraded away by the abrading means. FIG. 1 is significant in that it shows an embodiment of the invention in which the tightening member and the finishing member are one. Thus in FIG. 1 the cavity 10 includes a threaded opening 14, extending outwardly to receive a threaded abrading member 16. The abrading member 16 has an abrading head 18 and a distal slot 19. The arrangement allows the abrading head 18 to contact the peripheral thread 6 of the screw head 4 whereby rotation of the abrading member 16 on the head 4 acts to remove the thread 6.

In FIG. 1 the tightening member 8 comprises a head 20 and a shank 22 extending from the head 20. The head 20 is formed with the cavity 10.

To use the FIG. 1 embodiment the screw 2 is positioned as required and the tightening member 8, without the abrading member 16 is screwed onto the peripheral thread 6 on the head 4 of the screw 2. Tightening may be done by any appropriate means but the arrangement shown in FIG. 1 is that the shank 22 would be received in the bit of a drill (not shown) so that the screw 2 may be driven home rapidly.

Once the screw 2 is home the drill is reversed and the tightening member 8 withdrawn from the head 4. The abrading member 16 is then screwed in, using slot 19 formed in the abrading member 16. The drill is then turned, preferably slowly, so that the abrading member 16 cuts the thread 6 on the head 4 as the tightening member 8, now including the abrading member 16, is turned over the head 4. By this means the external thread 6 on the head of the screw is destroyed, rendering it impossible to remove the screw 2 without special tools, unlikely to be in the possession of a vandal.

The FIG. 2 embodiment differs from that of FIG. 1 by the provision of a finishing member 24 with a cavity 26 that omits the internal thread 12 on the tightening member 8. An internally threaded tightening member 8 may be used in the FIG. 2 embodiment to tighten screw 2 but the thread 6 is abraded by simply inserting a file 28 into an opening 30 in member 24. The file 28 has a surface 32 at the appropriate, desired angle and rotation of the finishing member 24 allows the file 28 to abrade the thread 6. Member 24 has a head 34 and shank 36.

FIGS. 3 and 4 illustrate a further aspect of the invention. In FIG. 3 a screw 2 with head 4 and external thread 6 on the head 4 is tightened into position and then the abrading tool 38 of FIG. 4 is rotated to abrade away the head 4. The abrasion is provided by an internal abrading surface 40 of a predetermined configuration, typically comprising blades 42 that remove the thread 6 of the head 4 and abrade the head 4 to a predetermined profile. Clearly such a predetermined profile is desirably one that cannot be gripped by everyday tools.

In effect the embodiment of FIG. 4 provides a finishing member able to change the configuration of a screw head to eliminate any means of loosening the screw head once the screw has been tightened. It should be noted that it is not restricted to the use with the screw 2 shown in, for example, FIGS. 1 and 2 but can be used with any screw head that projects above the surface. Tool 38 can be used to destroy sufficient of the head of the screw head as to make removal difficult.

The present invention thus provides simple systems to prevent the removal of screws and the like, for example, bolts by unauthorized people. It also provides, in FIG. 1, an efficient and rapid way of installing a screw.

I claim:

1. A system to install a vandal-resistant screw comprising:
    (a) a screw having a head and a peripheral thread on the head;
    (b) a tightening and fitting member comprising:
    a head;
    a cavity formed in the head;
    an internal thread within the cavity, able to tighten onto the peripheral thread on the head of the screw;
    a shank extending from the head;
    a threaded opening extending outwardly from the cavity to receive a threaded abrading member;
    an abrading member removably received in the threaded opening, the abrading member extending into the cavity whereby the thread on the periphery of an installed screw can be abraded away by an abrading member located in the threaded opening.

2. A system to install a vandal-resistant screw comprising:
    a fastener having a head;
    a peripheral thread on the head;
    a driver for the fastener comprising a socket and a shank extending from the socket;
    an internal thread in the socket to engage the peripheral thread on the fastener;
    an opening in a wall of the socket communicating with the interior of the socket;
    an abrading member removably mounted in the opening to extend into the interior of the socket whereby a fastener can be tightened using the driver by engagement of the internal thread in the socket with the peripheral thread on the head on the fastener and the peripheral thread on the fastener can then be removed by installing in the opening in the wall of the socket an abrading member that can be brought into contact with the peripheral thread to remove the peripheral thread.

* * * * *